United States Patent
Crow

[15] 3,705,750
[45] Dec. 12, 1972

[54] RETAINING PIN AND BEARING ASSEMBLY

[72] Inventor: Morgan L. Crow, Dallas, Tex.

[73] Assignee: Dresser Industries, Inc., Dallas, Tex.

[22] Filed: Nov. 5, 1970

[21] Appl. No.: 87,134

[52] U.S. Cl. .................. 308/8.2, 175/364, 175/372
[51] Int. Cl. .......... E21b 9/10, E21b 9/36, E02f 15/44
[58] Field of Search ............... 308/8.2, 207 R, 189 R; 175/342, 344, 345–348, 361–364, 371, 372

[56] References Cited

UNITED STATES PATENTS

| | | | |
|---|---|---|---|
| 1,768,577 | 7/1930 | Dallerup | 175/364 |
| 3,054,466 | 9/1962 | Wagnon et al. | 175/342 X |
| 1,791,767 | 2/1931 | Stokes | 175/364 X |
| 1,848,404 | 3/1932 | Abegg | 175/342 |
| 3,203,492 | 8/1965 | Lichte | 175/355 |
| 3,612,197 | 10/1971 | Motoyama | 175/364 |

*Primary Examiner*—David H. Brown
*Attorney*—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

An elongated retaining pin having offset end portions allows a bearing assembly to be loosened and easily removed. During operation, the retaining pin is held in position. When the bearing is to be disassembled, the retaining pin is rotated to loosen the bearing assembly.

5 Claims, 7 Drawing Figures

INVENTOR
MORGAN L. CROW

*Eddie E. Scott*

ATTORNEY

INVENTOR
MORGAN L. CROW

ATTORNEY

INVENTOR
MORGAN L. CROW

ATTORNEY

INVENTOR
MORGAN L. CROW

ATTORNEY

RETAINING PIN AND BEARING ASSEMBLY

BACKGROUND OF THE INVENTION

The present invention relates to an improved bearing assembly and more particularly to a retaining pin that allows the bearing assembly to be easily assembled and disassembled. The bearing assembly of the present invention includes an outer bearing element and an inner hollow cylindrical bearing shell. A retaining pin is positioned in the center of the inner hollow cylindrical bearing shell and mounted between a pair of support arms. An important requirement of the bearing assembly is that it must be easy to assemble. In addition, the bearing assembly must lock firmly in place during operation. The bearing assembly must be easy to disassemble. The bearing assembly generally operates under severe conditions and may be subject to corrosion and high amounts of stress.

Large diameter earth boring bits and certain track vehicles operate under exposure to a corrosive fluids, highly abrasive conditions, temperature extremes and high loads. When it becomes necessary to disassemble the bearing assemblies, difficulties are often encountered in that the parts are wedged tightly together and may be heavily corroded.

DESCRIPTION OF THE PRIOR ART

In U.S. Pat. No. 3,203,492 to C. L. Lichte, patented Aug. 31, 1965, a large hole earth boring drill bit is shown. This bit includes a number of relatively small rolling or rotatable cutters mounted on the bit head. The rolling cutters are mounted between a pair of support arms and held in place by a retaining pin. The retaining pin is positioned in the central opening of a hollow bearing element. The cutters rotate about the bearing element. The bearing element includes portions adapted to fit in engagement with recesses in the support arms. The portions of the bearing element and the recesses in the support arms wedge into tighter interlocking engagement upon relative movement in one direction.

Summary of the Invention

The present invention provides a bearing assembly with a retaining pin having offset end portions. The bearing assembly is securely locked into position during operation and is easily removed to facilitate replacement of parts. The bearing shell includes portions adapted to engage a recess in the support arms and wedge into tighter engagement upon rotation in one direction. The pin is locked in a first position during operation. When the bearing is to be disassembled, the pin is released and rotated. This loosens the bearing shell and allows the assembly to be removed.

It is therefore an object of the present invention to provide an improved bearing assembly.

It is a still further object of the present invention to provide a bearing assembly that may be easily removed.

It is a still further object of the present invention to provide a pin having offset end portions.

The above and other objects and advantages of the present invention will become apparent from a consideration of the following detailed description when taken in conjunction with the accompanying drawings.

DETAILED DESCRIPTION OF THE INVENTION

Figure 1:
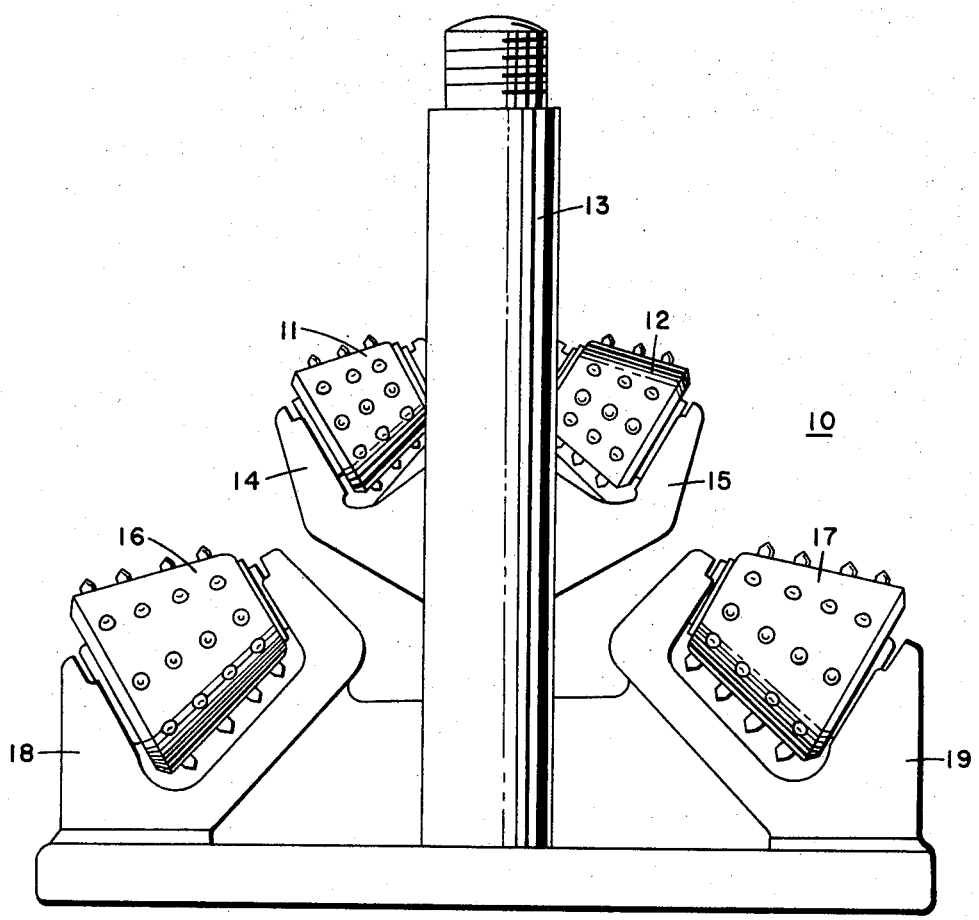
FIG. 1 shows a large diameter bit including a multiplicity of rotatable cutters.

Referring now to FIG. 1, a large diameter earth boring bit is shown generally at 10. A pair of rotatable cutters 11 and 12 are positioned next to the central shaft 13 and mounted in a pair of saddles 14 and 15. At least two cutters are generally used at a given radius about the center to insure a balanced drilling bit and a smooth drilling operation. Saddles 14 and 15 are mounted on central shaft 13. The saddles 14 and 15 allow the cutters to be easily removed and new cutters inserted. A second pair of cutters 16 and 17 are located below cutters 11 and 12. Cutters 16 and 17 are mounted in a pair of saddles 18 and 19 mounted on the frame of the large diameter bit 10. The upper end of shaft 13 is threaded to allow the bit 10 to be connected to a rotary drill string (not shown).

The drilling operation generally proceeds by the drilling of a small diameter hole approximately the size of shaft 13. The small diameter hole is drilled to an opening and the small diameter bit removed from the drill string. The large diameter bit 10 is then attached to the drill string and rotated and hydraulically raised along the pilot hole thereby enlarging it to the desired size. As bit 10 rotates, cutters 11, 12, 16 and 17 contact and disintegrate the formation. The cutting surfaces of cutters 11, 12, 16 and 17 should traverse the entire surface of the hole being drilled and the saddles and other portions of the bit should not contact the formations.

Difficulty has been encountered in providing adequate bearing support for the rotating cutters of the large diameter bit 10. The bearing must be securely locked in place during drilling and must include means for releasing the cutters from the saddles to allow a change of cutters and bearings.

Figure 2:
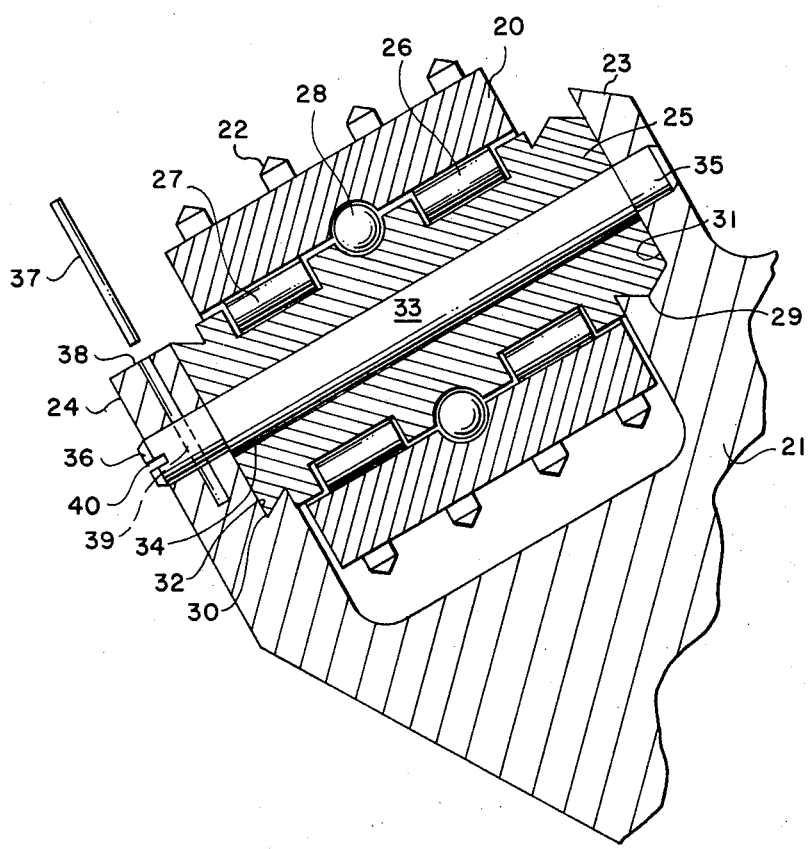
FIG. 2 shows the saddle and cutter of an earth boring bit.

Referring now to FIG. 2, a rolling cutter 20 similar to those shown in FIG. 1 is mounted in a saddle 21. The rolling cutter 20 includes inserts 22 mounted on its outer surface for disintegrating the earth formations. Saddle 21 includes a pair of individual support arms 23 and 24. A bearing shell 25 is positioned between support arms 23 and 24 and in the annulus of cutter 20. Two series of rollers 26 and 27 and a series of balls 28 are positioned between bearing shell 25 and cutter 20 to facilitate rotation of the cutter. Bearing shell 25 includes dovetail portions 29 and 30 that extend outwardly. Recesses 31 and 32 in the support arms 23 and 24 receive the dovetail portions 29 and 30 and prevent the bearing shell 25 from rotating with respect to the saddle 21. The cooperation of these two elements is fully described in U.S. Pat. No. 3,203,492 to C. L. Lichte, patented Aug. 31, 1965. The eccentric dovetail portions 29 and 30 interengage recesses 31 and 32 and wedge into tighter interlocking engagement upon relative rotational movement in one direction.

A pin 33 fits through holes in support arms 23 and 24. The pin 33 consists of a central body portion 34 and end portions 35 and 36. The central axis of the end portions 35 and 36 are offset from the central axis of the body portion 34. A retaining element 37 may be positioned in a hole 38 in support arm 24 and extended through a hole 39 in pin 33. This prevents pin 33 from rotating and places the larger body portion 34 of pin 33 in the proper position.

It can be appreciated that as the earth boring bit is exposed to the drilling environment, the bearing shell 25 will become so firmly locked into position that attempts to release it and disassemble the cutter and bearing assemblies will become difficult. This is due to the high stress placed upon the earth boring bit causing the dovetail portions to become wedged into a tight interlocking fit and from corrosion and the accumulation of materials around the areas where bearing shell 25 is connected to the saddle 21.

This difficulty is overcome by the present invention. When removal of the cutter and bearing assembly is desired, the retaining element 37 is extracted. The pin 33 is then rotated to move the extended body portion 34 away from the wedged areas of dovetail portions 31 and 32 to loosen the bearing shell 25. A slot 40 is provided in the end of pin 33 to allow rotary torque to be applied to the pin.

Figure 3:
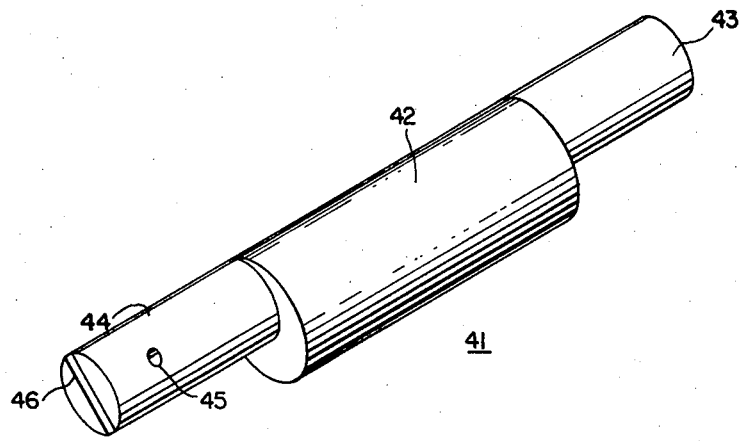
FIG. 3 shows a pin for retaining the bearing assembly in position.

Referring now to FIG. 3, a retaining pin 41 of the present invention is shown. The retaining pin includes an elongated cylindrical body portion 42 and smaller cylindrical end portions 43 and 44. The central axes of cylindrical end portions 43 and 44 are offset from the central axis of cylindrical body portion 42. A small hole 45 extends through pin 41 and slot 46 is located at the end of pin 41.

Figure 4:
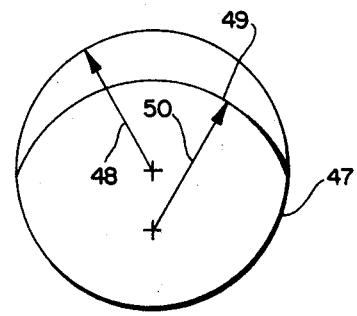
FIG. 4 is an end view of another embodiment of the present invention.

Referring now to FIG. 4, an end view of another embodiment of the pin of the present invention is shown. The pin 47 has a cylindrical body portion with a radius 48. The end portions rather than being regular cylinders include a section 49 having a smaller cross section than the central body portion. The section 49 may be circular with a radius 50 having its apex offset from the central axis of the main body. Radius 50 may or may not be equal to radius 48. The distance from the surface of section 49 to the central axis is therefore less than the corresponding distance from the surface of the adjacent section of the central body portion to the central axis.

Figure 5:
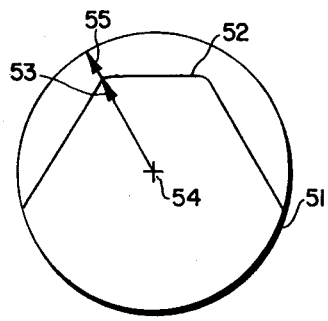
FIG. 5 is an end view of still another embodiment of the present invention.

Referring now to FIG. 5, an end view of still another embodiment of the pin of the present invention is shown. Pin 51 includes a cylindrical body portion and end portions having a section 52 with a smaller cross section than the body portion. The distance from a point 53 on the surface of section 52 to central axis 54 is less than the corresponding distance from a point 55 on the adjacent section of the body portion to central axis 54.

Figure 6:
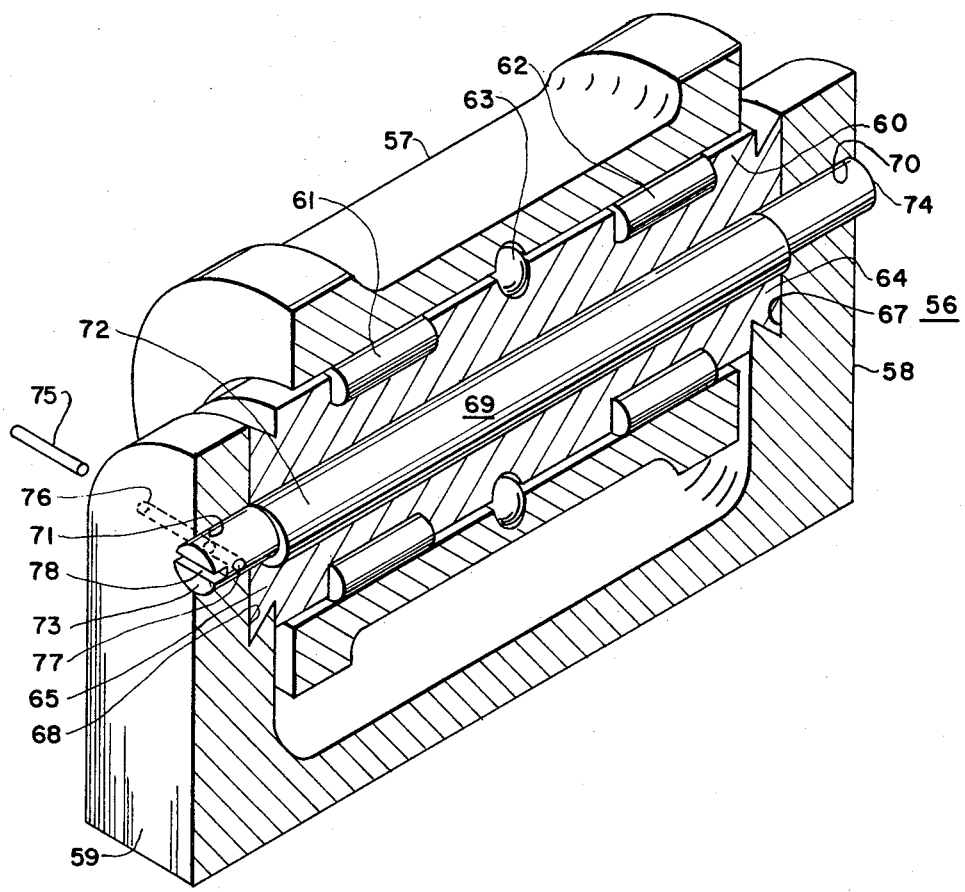
FIG. 6 is a view, partially in section, of a bearing assembly of the present invention.

A bearing assembly for use under severe conditions such as on track vehicles is shown generally at 56 in FIG. 6. An outer rolling member 57 is positioned between a pair of support arms 58 and 59. The rolling member 57 receives the load from the track or other load applying element. A bearing shell 60 is positioned between support arms 58 and 59 and in the annulus of outer rolling member 57. Two series of rollers 61 and 62 and a series of balls 63 are positioned between bearing shell 60 and outer rolling member 57 to facilitate rotation. Bearing shell 60 includes dovetail portions 64 and 65 that extend outwardly. Recesses 67 and 68 in the support arms 58 and 59 receive the dovetail portions 64 and 65 and prevent the bearing shell from rotating with respect to the support arms. The dovetail portions 64 and 65 are eccentric to the central axis of the bearing shell 60 and interengage recesses 67 and 68 thereby wedging into tighter interlocking engagement upon relative rotation in one direction.

A pin 69 fits through holes 70 and 71 in support arms 58 and 59 respectively. The pin 69 consists of a central body portion 72 and end portions 73 and 74. The central axes of the end portions 73 and 74 are offset from the central axis of the body portion 72. A retaining element 75 may be positioned in a hole 76 in support arm 58 and extended through a hole 77 in the pin 69. This prevents pin 69 from rotating and places the larger body portion 72 in the proper position.

When the bearing assembly 56 is to be dismantled, the retaining element 7 is extracted. The pin 69 is then rotated to move the body portion 72 from the position shown in FIG. 6 and loosen the bearing shell 60. A slot 78 is provided in the end of pin 69 to allow rotary torque to be applied to pin 69. A hexagonal hole, or square hole, or other torque transmitting means can be provided in the end of the pin 69 to rotate it from the locked position to the released position.

Figure 7:
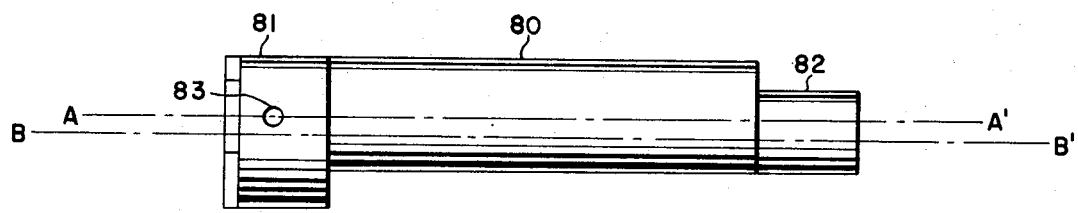
FIG. 7 is another embodiment of the present invention.

Referring now to FIG. 7, another embodiment of a pin of the present invention is shown generally at 79. The pin 79 includes a main body portion 80 and two end portions 81 and 82. The central axis BB' of the end portions 81 and 82 is offset from the central axis AA' of the body portion. A hole 83 in one of the end portions 81 allows pin 79 to be locked firmly in place in the support arms (not shown). The outer end of end portion 81 is hexagonal to allow rotary torque to be applied to pin 79.

The embodiments of the invention in which an exclusive property or privilege is claimed are defined as follows:

1. An improved bearing assembly comprising:
   a pair of support arms;
   an outer rolling member positioned between said pair of support arms, said outer rolling member having a central annulus;
   a bearing shell positioned between said pair of support arms in the annulus of said outer rolling member, said bearing shell having a central annulus;
   means on said support arms and means on said bearing shell adapted to wedge into tighter interlocking engagement upon relative movement in one direction for stabilizing said bearing shell;
   bearing means between said outer rolling member and said bearing shell; and
   a pin positioned between said pair of support arms in the central annulus of said bearing shell, said pin having an elongated main pin body with a central axis and end portions extending from the ends of the main pin body, said end portions having central axes offset from the central axis of said main pin body 2. The bearing assembly of claim 1 including means for selectively preventing said pin from rotating with respect to said support arms.

3. The bearing assembly of claim 2 wherein said pin includes means for allowing rotary torque to be applied to said pin.

4. An earth boring bit comprising:
a main bit body;
at least one pair of support arms extending from said main bit body, each support arm having a hole and a recess;
a rolling cutter positioned between said pair of support arms, said rolling cutter having a central annulus;
a bearing shell positioned between said pair of support arms in the annulus of said rolling cutter, said bearing shell having a central annulus and portions adapted to fit in tapered engagement with said recesses in said support arms thereby wedging into tighter interlocking engagement upon relative movement in one direction;
bearing means between said bearing shell and said rolling cutter;
a retaining pin with a central axis positioned between said support arms in the annulus of said bearing shell and extending into the holes in said support arms, said retaining pin having an elongated main pin body and end portions, said end portions having a section wherein the distance to the central axis is less than the corresponding distance from the adjacent sections of the body portion to the central axis; and
means for selectively preventing said pin from rotating with respect to said saddle.

5. The earth boring bit of claim 4 including means for allowing rotary torque to be applied to said pin.

* * * * *